(12) United States Patent
Camci et al.

(10) Patent No.: US 8,821,123 B2
(45) Date of Patent: Sep. 2, 2014

(54) DOUBLE-DUCTED FAN

(75) Inventors: Cengiz Camci, Boalsburg, PA (US); Ali Akturk, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 640 days.

(21) Appl. No.: 13/040,989

(22) Filed: Mar. 4, 2011

(65) Prior Publication Data

US 2011/0217163 A1    Sep. 8, 2011

Related U.S. Application Data

(60) Provisional application No. 61/311,672, filed on Mar. 8, 2010.

(51) Int. Cl.
*F01D 25/26* (2006.01)
(52) U.S. Cl.
CPC ..................................... *F01D 25/26* (2013.01)
USPC ........................................................ 416/189
(58) Field of Classification Search
CPC ......... F03D 1/04; B64C 39/064; B64C 27/20; B64C 39/024; B64C 2201/027; B64C 2201/108; B64C 2201/127; B64C 39/06; B64C 11/001; B64C 2201/162
USPC .......... 415/2.1, 121.2, 148, 227; 416/191, 88, 416/189; 60/771, 226.3; 244/206, 12.2, 4 R, 244/23 R, 21
See application file for complete search history.

(56) References Cited

U.S. PATENT DOCUMENTS

| | | | |
|---|---|---|---|
| 2,330,907 A * | 10/1943 | Dodge et al. ................... | 415/185 |
| 2,951,661 A | 12/1957 | Dorman et al. | |
| 2,968,453 A | 1/1961 | Bright | |
| 2,988,301 A | 6/1961 | Fletcher | |
| 3,054,578 A * | 9/1962 | Brocard ....................... | 244/23 C |
| 3,058,693 A | 10/1962 | Doak | |
| 3,073,551 A * | 1/1963 | Bowersox ................... | 244/23 C |

(Continued)

OTHER PUBLICATIONS

Martin et al., Performance and Flowfield Measurements on a 10-inch Ducted Rotor VTOL UAV; Army/NASA Rotorcraft Division; Aeroflightdynamics Directorate. AMRDEC US Army Research Development and Engineering Command Ames Research Center, pp. 88-107.

(Continued)

*Primary Examiner* — Edward Look
*Assistant Examiner* — Eldon Brockman
(74) *Attorney, Agent, or Firm* — Novak Druce Connolly Bove + Quigg LLP

(57) ABSTRACT

A double-ducted fan includes a hub, a rotor having a plurality of blades rotatably and coupled to the hub, a first duct, a second duct, and a channel defined between the first duct and second duct. The first duct circumscribes the rotor, and the second duct circumscribes at least a portion of the first duct. The second duct can be oriented axially upward such that there is an axial distance is between the leading edges of the first duct and second duct. The channel can be configured to direct air flow cross-wise to the first duct over a top of the first duct into the inlet side of the fan. The second duct can be movable relative to the first duct to adjust at least a portion of the channel. The length of the first duct can be different from the length of the second duct.

18 Claims, 8 Drawing Sheets

(56) References Cited

U.S. PATENT DOCUMENTS

| | | | |
|---|---|---|---|
| 3,101,917 A | 8/1963 | Sudrow | |
| 3,128,062 A * | 4/1964 | Brocard | 244/23 C |
| 3,173,478 A * | 3/1965 | Maycen | 165/121 |
| 3,184,183 A | 5/1965 | Piasecki | |
| 3,224,712 A * | 12/1965 | Taylor et al. | 244/53 B |
| 3,276,723 A * | 10/1966 | Miller et al. | 244/12.2 |
| 3,489,374 A * | 1/1970 | Morcom | 244/12.2 |
| 3,519,224 A | 7/1970 | Boyd et al. | |
| 3,584,810 A * | 6/1971 | Velton | 244/23 C |
| 3,785,592 A * | 1/1974 | Kerruish | 244/12.2 |
| 4,037,807 A * | 7/1977 | Johnston et al. | 244/7 B |
| 4,049,218 A | 9/1977 | Wen | |
| 4,189,281 A * | 2/1980 | Katagiri et al. | 415/222 |
| 4,320,304 A | 3/1982 | Karlsson et al. | |
| 4,324,985 A * | 4/1982 | Oman | 290/55 |
| 4,684,316 A * | 8/1987 | Karlsson | 415/211.1 |
| 4,720,640 A * | 1/1988 | Anderson et al. | 290/43 |
| 4,776,755 A * | 10/1988 | Bjorkestam et al. | 415/121.2 |
| 4,781,523 A * | 11/1988 | Aylor | 415/218.1 |
| 4,795,111 A | 1/1989 | Moller | |
| 4,796,836 A | 1/1989 | Buchelt | |
| 5,035,377 A * | 7/1991 | Buchelt | 244/12.1 |
| 5,046,685 A * | 9/1991 | Bose | 244/23 C |
| 5,149,513 A | 9/1992 | Fleming et al. | |
| 5,150,857 A | 9/1992 | Moffitt et al. | |
| 5,152,478 A | 10/1992 | Cycon et al. | |
| 5,292,088 A | 3/1994 | Lemont | |
| 5,295,643 A * | 3/1994 | Ebbert et al. | 244/7 B |
| 5,890,441 A | 4/1999 | Swinson et al. | |
| 6,073,881 A * | 6/2000 | Chen | 244/23 C |
| 6,170,778 B1 | 1/2001 | Cycon et al. | |
| 6,270,038 B1 | 8/2001 | Cycon et al. | |
| 6,382,904 B1 * | 5/2002 | Orlov et al. | 415/4.5 |
| 6,450,445 B1 | 9/2002 | Moller | |
| 6,464,166 B1 | 10/2002 | Yoeli | |
| 6,547,180 B1 | 4/2003 | Cassidy | |
| 6,575,401 B1 * | 6/2003 | Carver | 244/12.2 |
| 6,705,905 B1 * | 3/2004 | Tanaka et al. | 440/12.51 |
| 6,834,829 B2 * | 12/2004 | Dunagin, Jr. | 244/26 |
| 6,837,457 B2 * | 1/2005 | Kirjavainen | 244/17.23 |
| 6,883,748 B2 | 4/2005 | Yoeli | |
| 6,886,776 B2 | 5/2005 | Wagner et al. | |
| 6,910,327 B2 | 6/2005 | Sakurai et al. | |
| 6,968,675 B2 * | 11/2005 | Ramlaoui et al. | 60/226.2 |
| 7,018,166 B2 * | 3/2006 | Gaskell | 415/4.3 |
| 7,032,861 B2 | 4/2006 | Sanders, Jr. et al. | |
| 7,147,183 B1 * | 12/2006 | Carr et al. | 244/12.2 |
| 7,249,732 B2 * | 7/2007 | Sanders et al. | 244/23 A |
| 7,275,712 B2 | 10/2007 | Yoeli | |
| 7,407,132 B2 * | 8/2008 | Kirjavainen | 244/23 R |
| 7,836,678 B1 * | 11/2010 | Yan et al. | 60/200.1 |
| 7,841,563 B2 * | 11/2010 | Goossen et al. | 244/175 |
| 7,874,788 B2 * | 1/2011 | Stothers et al. | 415/4.5 |
| 7,980,811 B2 * | 7/2011 | Presz et al. | 415/4.3 |
| 7,997,059 B1 * | 8/2011 | Yan et al. | 60/200.1 |
| 8,020,804 B2 * | 9/2011 | Yoeli | 244/23 D |
| 8,302,901 B2 * | 11/2012 | Hatton et al. | 244/12.2 |
| 8,496,200 B2 * | 7/2013 | Yoeli | 244/23 B |
| 2003/0098388 A1 * | 5/2003 | Walmsley | 244/12.2 |
| 2004/0104303 A1 | 6/2004 | Mao | |
| 2004/0129831 A1 * | 7/2004 | Dunagin, Jr. | 244/26 |
| 2006/0032972 A1 * | 2/2006 | Vavra | 244/12.2 |
| 2006/0214052 A1 * | 9/2006 | Schlunke | 244/12.2 |
| 2007/0034738 A1 * | 2/2007 | Sanders et al. | 244/23 A |
| 2007/0034739 A1 | 2/2007 | Yoeli | |
| 2008/0092548 A1 | 4/2008 | Morford et al. | |
| 2010/0140415 A1 * | 6/2010 | Goossen | 244/23 A |
| 2010/0201132 A1 * | 8/2010 | Ivanovich | 290/55 |
| 2011/0139939 A1 * | 6/2011 | Martin et al. | 244/23 A |
| 2011/0147533 A1 * | 6/2011 | Goossen et al. | 244/23 A |
| 2012/0126064 A1 * | 5/2012 | Entsminger et al. | 244/23 A |
| 2012/0153087 A1 * | 6/2012 | Collette et al. | 244/23 A |
| 2012/0234984 A1 * | 9/2012 | Entsminger et al. | 244/23 A |

OTHER PUBLICATIONS

Mort et al., Aerodynamic Characteristics of a 4-Foot-Diameter Ducted Fan Mounted on the Tip of a Semispan Wing; National Aeronautics and Space Administration; 35 pages (1962).

Abrego et al., Performance Study of a Ducted Fan System; American Helicopter Society Aerodynamics, Acoustics, and Test and Evaluation Technical Specialists Meeting 1-6 (2002).

Fleming et al., Improving Control System Effectiveness for Ducted Fan VTOL UAVS Operating in Crosswinds; American Institute of Aeronautics and Astronautics, 1-11 (2003).

Robert F. Davey; A Regenerative Ducted-Fan Engine for Small Aircraft; American Institute of Aeronautics and Astronautics, 1-10 (2005).

Graf et al., Improving Ducted Fan UAV Aerodynamics in Forward Flight; American Institute of Aeronautics and Astronautics, 1-11 (2008).

Avanzini et al., Performance and Stability of Ducted-Fan Uninhabited Aerial Vehicle Model; Journal of Aircraft; 40(1) 1-8, (2003).

Nicola de Divitiis; Performance and Stability Analysis of a Shrouded-Fan Unmanned Aerial Vehicle; Journal of Aircraft, 43(3) 1-11 (2006).

Lipera et al., The Micro Craft iSTAR Micro Air Vehicle: Control System Design and Testing; American Helicopter Society International, Inc., 1-11 (2001).

Mark W. Kelly; Large-Scale Wind-tunnel Studies of Several VTOL Types; Ames Research Center; 35-48.

Nicola de Divitiis; Aerodynamic Modeling and Performance Analysis of a Shrouded-Fan Unmanned Aerial Vehicle; Department of Mechanics and Aeronautics, University of Rome "La Sapienza"; 1-10; (2002).

Avanzini et al.; Design and development of a vertical take-off and landing uninhabited aerial vehicle; Proc. Instn Mech. Engrs vol. 217 Part G: J. Aerospace Engineering, 169-178 (2003).

Fleming et al., Improved Control of Ducted Fan VTOL UAVs in Crosswind Turbulence; American Helicopter Society International, Inc; 1-12 (2004).

Guerrero et al., A Powered Lift Aerodynamic Analysis for the Design of Ducted Fan UAVS; American Institute of Aeronautics and Astronautics; 1-8.

Robert J. Weir; Aerodynamic Design Considerations for a Free-Flying Ducted Propeller; Sandia National Laboratories; Albuquerque, NM; 420-431.

Rob Ransone; A Photo History of Experimental VSTOL Aircraft and Their Contributions; Presented to AIAA's X-Planes Symposium, 1-7 (2002).

* cited by examiner

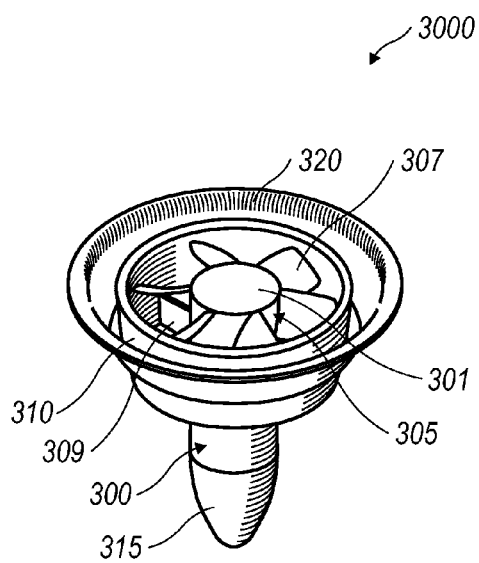
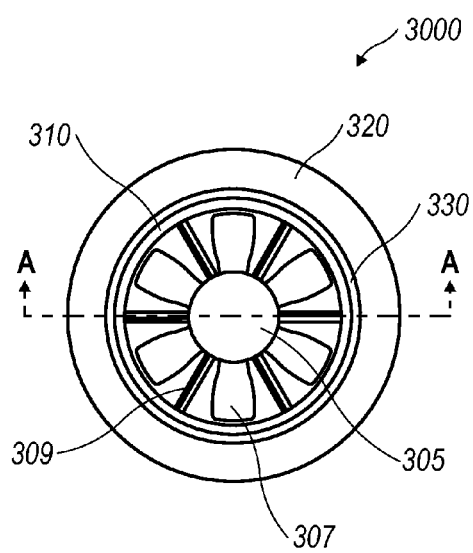
FIG. 3A  FIG. 3B
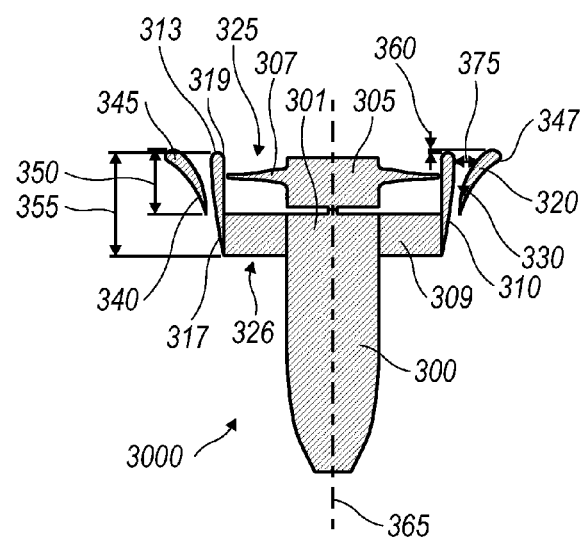
FIG. 3C

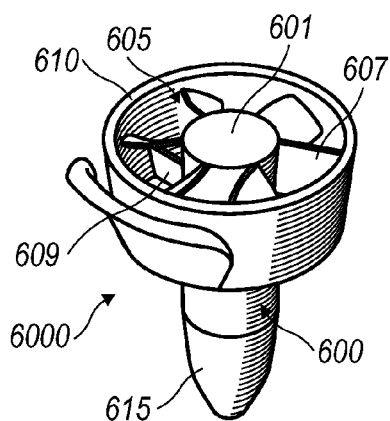
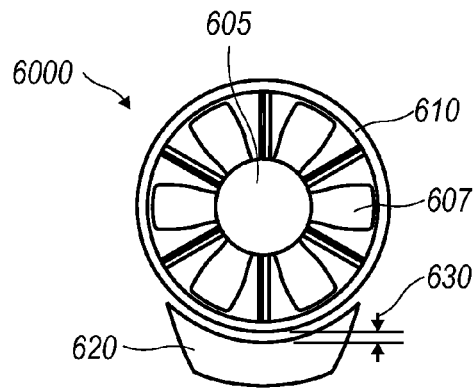
FIG. 6A
FIG. 6B
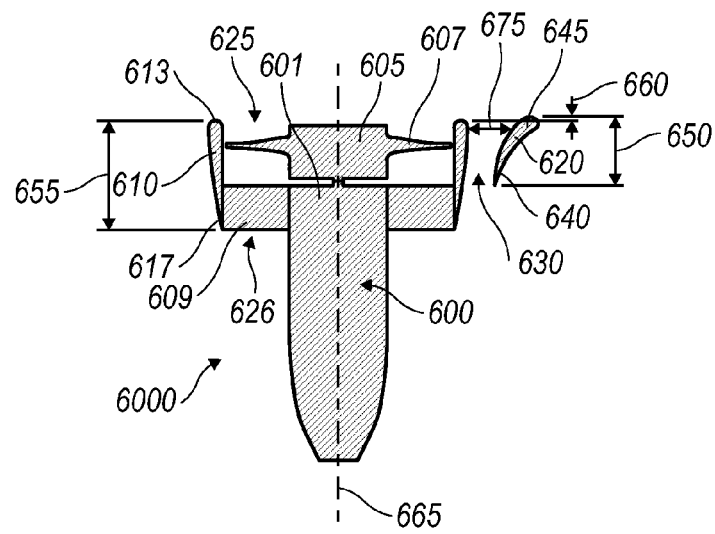
FIG. 6C

DOUBLE-DUCTED FAN

CROSS-RELATED APPLICATIONS

This application claims the benefit of U.S. Provisional Application No. 61/311,672 entitled "Double-Ducted Fan," filed on Mar. 8, 2010, which is incorporated herein by reference in its entirety.

FEDERALLY SPONSORED RESEARCH

The subject matter disclosed herein was developed with government support under grant no. W911W6-06-2-0008 awarded by the U.S. Army Research Office. The U.S. government has certain rights in the invention.

FIELD OF TECHNOLOGY

The present disclosure relates to ducted fans. More specifically, the present disclosure relates to ducted fans for axial-flow fan systems.

BACKGROUND

Axial-flow fan units include rotating, airfoil-based rotor blades in which the working fluid (e.g., air or other gas) principally flows parallel to the axis of rotation. Axial-flow fans, and particularly axial-flow ducted fans, are typically used in turbomachinery, such as jet engines, high-speed ship engines, and small-scale power stations. They are also used in industrial applications such as large-volume air separation plants, supplying blast furnace air or fluid catalytic cracking air, and propane dehydrogenation. Additionally, axial-flow fans can be used in cooling fans for homes, automobiles, locomotive vehicles, buses, marine vehicles, and aircrafts such as vertical and short take-off and landing (VSTOL) vehicles and uninhabited aerial vehicles.

In some situations, there can be inlet flow separation at the inlet of the axial-flow fan. For example, inlet flow separation can occur when the inlet flow direction is misaligned with the rotational axis of the axial-flow fan system. Conventional axial-flow fans are often implemented in VSTOL vehicles to generate the lift force required for hover-type flight. For example, an axial-flow fan, such as an axial-flow ducted fan, can generate a downward-facing force required for hover-type flight. As shown in FIGS. 1A-1C, a conventional fan 1000 includes a hub 100 having a front portion 101 and an end portion 115, a rotor 105 having a plurality of blades 107 rotatably coupled to the front portion 101 of the hub 100, and a duct 110 circumscribing the blades 107 of the rotor 105. In the particular embodiment illustrated, the duct 110 is a cylindrical structure that surrounds the blades 107 of the rotor 105. The duct 110 is coupled to the hub 100 by a plurality of outlet vanes 109. In between the front portion 101 of the hub 100 and the duct 110 is the inlet 125. The inlet 125 includes an inlet lip 119 proximate to the leading edge of the duct 110. The illustrated conventional axial-flow fan 1000 has a single duct 110. During horizontal flight, cross-wise air flow (e.g., air flowing perpendicular to the rotational axis of the rotor 105) encounters the outer surface of the duct 110. The cross-wise air flow separates between the top and the bottom of the duct 110. The air flow that travels across the leading edge of the duct 110 and past the inlet lip 119 enters the inlet 125. However, as air flow enters the inlet 125, there can be flow separation at the inlet lip 119 of the duct 110. This distortion will be referred to herein as lip separation. The cross-wise air flow is moved and forced through the inlet 125 by the rotating blades 107 of the rotor 105. The air flow exits the duct 110 at an outlet 126 beneath the outlet vanes 109.

BRIEF DESCRIPTION OF THE DRAWINGS

Various embodiments will now be described, by way of example only, with reference to the attached Figures, wherein:

FIG. 3A is a perspective view of another embodiment of a double-ducted fan in accordance with the technology that is the subject matter of this disclosure, which has a second duct that is shorter than the first duct;

FIG. 3B is a front view of the double-ducted fan illustrated in FIG. 3A;

FIG. 3C is a vertical cross-section view, taken along lines A-A, of the double-ducted fan illustrated in FIG. 3A;

FIG. 6A is a perspective view of an exemplary double-ducted fan, which has a second duct that is a partial duct;

FIG. 6B is a front view of the double-ducted fan illustrated in FIG. 6A;

FIG. 6C is a vertical cross-section view, taken along lines A-A, of the double-ducted fan illustrated in FIG. 6A;

DETAILED DESCRIPTION

Figure 1A:
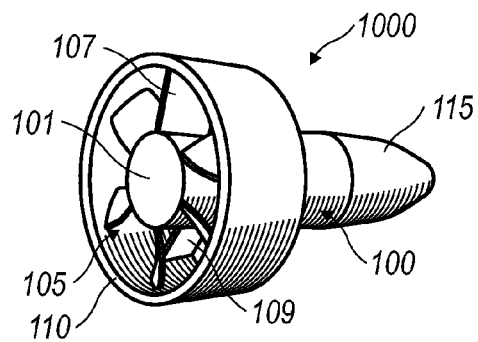
FIG. 1A is a perspective view of a prior art conventional ducted fan.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

Figure 1B:
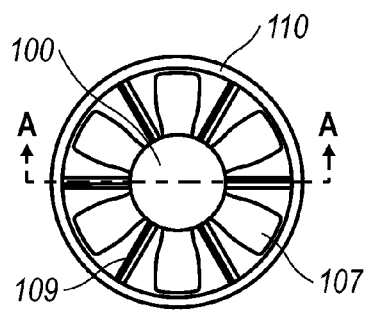
FIG. 1B is front of the conventional ducted fan illustrated in FIG. 1A.
Figure 1C:
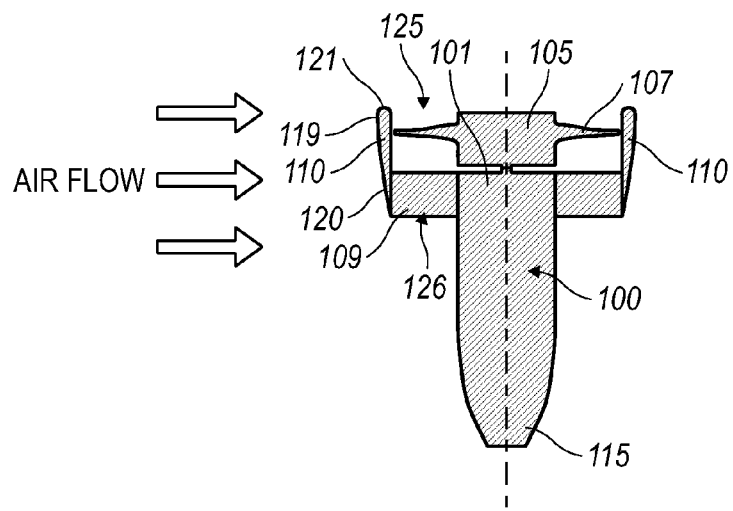
FIG. 1C is a vertical cross-section view, taken along lines A-A, of the conventional ducted fan illustrated in FIG. 1A.

In VSTOL vehicles having an axial-flow ducted fan, such as the axial-flow ducted fan 1000 illustrated in FIG. 1, the VSTOL vehicle can be adapted to horizontally move at a ninety (90) degree angle of attack. During horizontal flight, the inlet flow direction can deviate from the axis of the rotation of the axial flow fan 1000. For example, as air flows perpendicular to the rotational axis of the axial flow fan 1000, air encounters the outer surface of the duct 110 which can divert the air flow from the entering the axial flow fan 1000 in the direction of the rotational axis of the axial flow fan 1000. The inlet flow separation near the lip 121 of the leading side 119 of the rotor 105 of the axial-flow fan 1000 can become more problematic with increasing vehicle speed. The inlet flow separation occurring on the inner side of the lip 121 of the duct 110 can also be referred to as lip separation. The inlet flow separation at the inner side of the lip 121, proximate to the rotor 105, can limit the lift generation and controllability of the VSTOL. In general, the air flow at the leading side 119 of the rotor 105 is more distorted or separated than compared to the trailing side 120 of the axial-flow fan 1000. The trailing side 120 total pressure can be higher than the total pressure observed near the leading 119 side at the outlet 126 of the fan. The flow near the leading side 119 can be negatively influenced by a separated flow that can be characterized as re-circulatory, low momentum and turbulent. Vibratory loads which can be due to this separated flow zone can be excessive.

Conventional axial flow fan systems, such as axial flow ducted fans, can also have a lip clearance loss (e.g., the distortion of air flow at the lip of the axial flow fan) that is proportional with the effective lip gap (e.g., the difference in height measured along the rotational axis of the fan between the lip 121 of the duct 110 and the blade 107 of the rotor 105) of the axial flow fan design. The specific shape of the lip 121 and the surface properties of the surface of the lip 121 can influence the magnitude of flow separation at the lip 121. The flow separation can be observed as a substantial total pressure loss near the outlet 126 of the duct 110 measured around the circumference of the duct 100 when the VSTOL is hovering with no horizontal flight. When the VSTOL transitions into a horizontal flight zone (for example, forward flight), the total pressure loss or deficit at the outlet 126 of the duct 110 near the leading side 119 can be more significant than pressure loss during hovering. In addition to the conventional lip clearance loss, additional losses near the leading side 119 can result from the re-circulatory low momentum fluid entering into the duct 110 near the lip 121. The air flow entering into an axial flow fan 1000 in horizontal flight can result in the loss of energy, an imbalance of the local mass flow rates between the leading side and trailing side, an imbalance of the total pressure resulting at the rotor exit between the leading side and trailing side, a significant loss of lifting ability due to highly non-axisymmetric and unnecessarily 3D fan exit jet flow, and unwanted nose-up pitching moment generation, which can each result from the local static distributions imposed on the duct inner surfaces.

Additionally, when a VSTOL axial-flow ducted fan is in horizontal flight (that is, when the air flow encounters the axial-flow ducted fan perpendicular to the rotational axis of the axial-flow ducted fan), problems related to flow separation at the lip 121 of the leading edge 119 can be encountered. The flow separation can lead to problems within the duct 110 and can result in a high nose-up pitching moment as the forward speed is increased. Furthermore, at high angle of attacks, the onset flow separation at the upstream lip of the duct 110 can distort inlet air flow into the rotor 105 of the axial-flow ducted fan 1000. The distorted inlet flow can cause an asymmetric loading of the axial-flow ducted fan 1000, which can increase the power required for un-accelerated flight, vibratory loads and noise level. Even more, fuel consumption can increase due to the flow separation. Also, the flow separation can cause non-uniformity of air flow through the axial-flow fan 1000, which can complicate control of the vehicle.

The present disclosure presents a double-ducted fan based on a fluid mechanics scheme of reducing and controlling the upstream lip separation of a ducted fan. For example, the double-ducted fan can reduce and control the upstream lip separation of a ducted fan operating at a high angle of attack during forward or horizontal flight.

A double-ducted fan according to the present technology includes a hub, a rotor rotatably coupled to the hub, a first duct, and a second duct, wherein the first duct circumscribes the rotor and the second duct circumscribes at least a portion of the first duct. The rotor has an inlet side and an outlet side. The first duct and the second duct can define a channel therebetween. The channel can be configured to direct air flow cross-wise to the first duct, over a top of the first duct, into the inlet side of the rotor. The second duct is oriented axially upward from the first duct such that there is an axial distance between a leading edge of the first duct and a leading edge of the second duct. In one embodiment the second duct is oriented at an angle with respect to the first duct. In another embodiment, the first duct and the second duct are concentrically oriented. In another embodiment, the first duct and the second duct are eccentrically oriented. In at least one embodiment, the first duct is the inner or intermediate duct, and the second duct is the outer duct. The orientation and configuration of the first duct and second duct of the double-ducted fan reduces and controls the upstream flow lip separation during operation at high angles of attack. Also, with the double-ducted fan disclosed herein, the lip separation near the leading side of the first duct can be significantly eliminated, thereby resulting in an enhanced balanced rotor exit flow filed between the leading side and the trailing side of the double-ducted fan. It will be appreciated that other configurations and arrangements will be described below in relation to illustrated embodiments. One of ordinary skill will appreciate that the elements from the embodiment illustrated herein can be optionally included and arranged in various combinations to achieve the described benefits of the presently disclosed double-ducted fan.

Figure 2A:
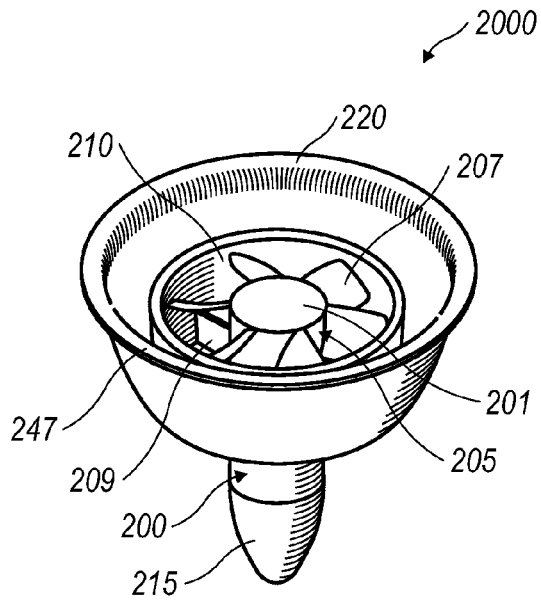
FIG. 2A is a perspective view of an exemplary double-ducted fan in accordance with the technology that is the subject matter of this disclosure.
Figure 2B:
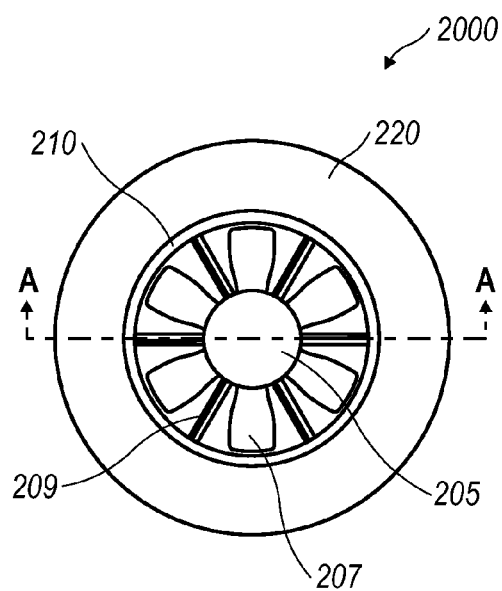
FIG. 2B is a front view of the double-ducted fan illustrated in FIG. 2A.
Figure 2C:
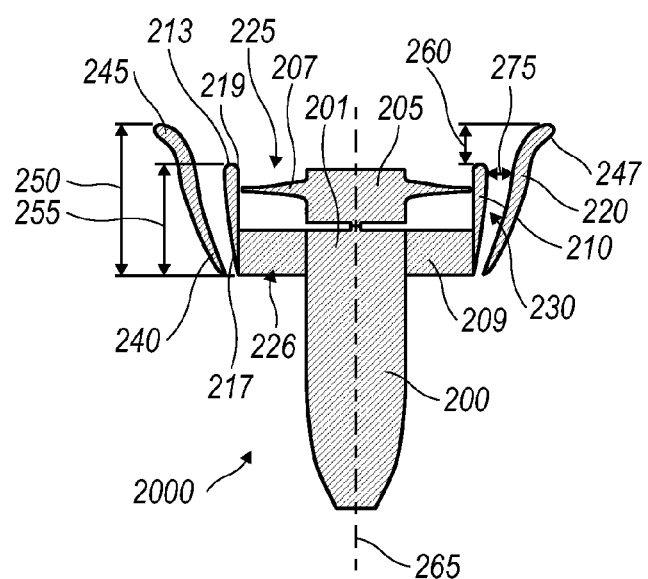
FIG. 2C is a vertical cross-section view, taken along lines A-A, of the double-ducted fan illustrated in FIG. 2A.

As shown in FIGS. 2A-2C, an exemplary embodiment of the double-ducted fan 2000 can include a hub 200 having a front portion 201 and an end portion 215. The end portion 215 of the hub can be a tail cone. A motor (not shown) and electrical wiring (not shown) for the double-ducted fan 2000 can be housed in the hub 200 and covered by the tail cone. While the illustrated hub 200 is an elongated structure, one of ordinary skill in the art will appreciate that the hub 200 can be a rectangular structure, an elliptical structure, a conical structure, or any other structure that is couplable with a rotor 205 and implemented in an axial-flow system.

A rotor 205 having a plurality of blades 207 is rotatably coupled to the front portion 201 of the hub 200. The double-ducted fan 2000 has a first duct 210 and a second duct 220. In the particular embodiment illustrated, the first duct 210 and the second duct 220 are cylindrical structures. The first duct 210 circumscribes the rotor 205. In other words, the first duct 210 is coupled to the rotor 200 such that the first duct 210 surrounds the rotor 205 and is radially spaced from the hub 200, similar to the configuration illustrated in FIGS. 2A-2C. As seen in the illustrated embodiment, the first duct 210 is coupled to the hub 200 at the trailing edge 217 of the first duct 210. In FIG. 2C, the first duct 210 is coupled to the hub 200 by a plurality of outlet vanes 209. The first duct 210 has a leading edge 213, a trailing edge 217, and a first length 255 between the leading edge 213 and the trailing edge 217. The leading edge 213 of the first duct 210 can be the surface defining the circumference of the first duct 210 that is proximate to the rotor 405. The trailing edge 217 of the first duct 210 can be the surface defining the circumference of the first duct 210 that is proximate to the hub 200. An inlet 225 is defined between the leading edge 213 of the first duct 210 and the rotor 205. An outlet 226 is defined between the trailing edge 217 of the first duct 210 and the hub 200. Air flow can enter the inlet 225 and pass through the rotor blades 207 to the outlet 226. For example, air can pass from the inlet 225 to the outlet of the rotor 205 when the double-ducted fan 2000 is in operation during horizontal motion and while the rotational axis of the rotor 205 is oriented at a ninety (90) degree angle of attack with respect to the ground. The first duct 210 includes an inlet lip 219 proximate to the leading edge 213 of the first duct 210.

A second duct 220 circumscribes the first duct 210 and can be radially spaced from the first duct 210. The second duct 220 can be held in place by a plurality of struts (not shown) radially attached to the first duct 210. The second duct 220 is coupled to the first duct 210 such that the rotor 205 is substantially at the center of the double-ducted fan 2000. In the illustrated embodiment, the first duct 210 and the second duct 220 are concentric. In at least one embodiment, the second duct 220 is stationary with respect to the first duct 210. As shown in FIG. 2C, the second duct 220 has a leading edge 245, a trailing edge 240, and a second length 250 (for example, a chord) between the leading edge 245 and the trailing edge 240. The leading edge 245 of the second duct 220 can be the surface defining the circumference of the second duct 220 that is proximate to the rotor 205. The trailing edge 240 of the second duct 220 can be the surface defining the circumference of the second duct 220 that is proximate to the hub 200. For example, in the illustrated embodiment, the second duct 220 has a second length 250 greater than the first length 255 of the first duct 210. Also, as seen in FIG. 2C, the leading edge 245 of the second duct 220 can have a duct or outer lip 247. Additionally, the leading edge 213 of the first duct 210 can have an inlet lip 219.

The second duct 220 can be oriented axially-upward with respect to the leading edge 213 of first duct 210 as illustrated in FIG. 2C. For example, the second duct 220 can be oriented such that the leading edge 245 of the second duct 220 is oriented axially-upward from the leading edge 213 of the first duct 210. In other words, the leading edge 245 of the second duct 220 is located forward and upward from the leading edge 213 of the first duct 210. As illustrated in FIG. 2C, the second duct 220 has a second length 250 longer than the first length 255 of the first duct 210. The trailing edge 240 of the second duct 220 and the trailing edge 217 of the first duct 210 are axially aligned so that there is an axial distance 260 between the leading edge 245 of the second duct and the leading edge 213 of the first duct 210. The first duct 210 and the second duct 220 define a channel 230 therebetween. The channel 230 can be a converging-diverging channel. For example, the width 275 of the channel 230 can vary from the trailing edges 217, 240 of the first and second ducts 210 and 220 to the leading edges 213, 245 of the first and second duct 210, 220 (e.g., the width 275 can increase or decrease between the trailing edges 217, 240 and the leading edges 213, 245). As the first duct 210 and the second duct 220 are concentric, the shape of the converging-diverging channel 230 does not vary circumferentially around the rotor 200. Also as shown in FIG. 2C, the first duct 210 and the second duct 220 have a cross-sectional airfoil shape. However, in alternative embodiments, the first duct 210 and the second duct 220 can have cross-sectional shape that is a circular shape, a cylindrical shape, an oval shape, or any other shape.

In the embodiment illustrated in FIGS. 2A-2C, during horizontal flight, cross-wise air flow will encounter the second duct 220 (e.g. air flow will move from the left to the right in FIG. 2C). As the cross-wise air flow encounters the duct lip 247, a portion of the air flow will travel upwards towards the leading edge 245 of the second duct 220, and a portion of the air flow will travel downwards towards the trailing edge 240 of the second duct 220 as the second duct 220 is an obstacle for the air flow. Due to the shape and orientation of the second duct 220, the air flow that travels across the leading edge 245 will flow across the leading edge 213 of the first duct 210, over the inlet lip 219, and into the inlet 225 as a result of the pressure differences between the leading edge 245 and leading edge 213. Similarly as a result of the pressure differences between the trailing edges 240 and 217 due to the shape and orientation of the second duct 220, the air flow that travels towards the trailing edge 240 of the second duct 220 will travel upwards through the channel 230, over the leading edge 213 of the first duct 210 and the inlet lip 219, and into the inlet 225. As the air flow encounters the second duct 220 first during horizontal flight, the air flow is separated at the second duct 220 before it encounters the inlet lip 219 of the first duct 210. Essentially, the upward air flow in the channel 230 adjusts a static pressure distribution proximate to the leading edge 213 of the first duct 210 and the inlet lip 219. The static pressure adjustment can generate a flow or circulation control effect proximate to the inlet lip 219 of the first duct 210. Thus, the air flow entering the inlet 225 is substantially uniform as lip separation is experienced at the second duct 220, and the flow experienced at the first duct is uniform. Therefore, the lip separation that would typically occur in conventional ducted fans is reduced. As a more uniform air flow profile enters the inlet 225, more uniform air flow exits the rotor 205 at the outlet 226, thereby reducing energy loss, total pressure imbalance, and mass-flow rate imbalance that can be associated with air flow distortion. Also, a double-ducted fan 2000 having a second duct 220 that is longer than the first duct 210 can provide for a higher duct thrust in the hover position or hovering flight of the vehicle as compared to conventional single-ducted fans. The double-ducted fan 2000 having a second duct 220 that is longer than the first duct 210 can generate a slightly elevated level of pitch-up moment that may force the leading side of the vehicle up in horizontal flight as compared to conventional single-ducted fans.

FIGS. 3A-3C illustrate another embodiment of the double-ducted fan described herein. FIGS. 3A-3C are substantially similar to the double-ducted fans illustrated in FIGS. 2A-2C, but differ in that the second duct 320 is shorter in length than the first duct 710. Common elements between the double-ducted fans illustrated in FIGS. 2A-2C are shown in FIGS. 3A3C except that the reference numerals are in the 300 series. As shown in FIGS. 3A-3C, another embodiment of the double-ducted fan 3000 includes a hub 300 having a front portion 301 and an end portion 315. The second duct 320 can be radially spaced from the first duct 310. The second duct 320 can be held in place by a plurality of struts (not shown) radially attached to the first duct 310. The second duct 320 is coupled to the first duct 310 such that the rotor 305 is substantially at the center of the double-ducted fan 3000. In the illustrated embodiment, the first duct 310 and the second duct 320 are concentric with the second duct 320 is stationary with respect to the first duct 310. In the illustrated embodiment, the first duct 310 and the second duct 320 are axisymmetric structures; however, one of ordinary skill in the art will appreciate that the first duct 310 and second duct 320 can be any structure that permits axial air flow into the inlet 325.

As shown in FIG. 3C, the second duct 320 has a leading edge 345, a trailing edge 340, and a second length 350 between the leading edge 345 and the trailing edge 340. The leading edge 345 of the second duct 320 can be the surface defining the circumference of the second duct 320 that is proximate to the rotor 305. The trailing edge 340 of the second duct 320 can be the surface defining the circumference of the second duct 320 that is proximate to the hub 300. For example, in the illustrated embodiment, the second duct 320 has a second length 350 so that the second duct 320 is shorter in length than the first duct 310. In comparison to the embodiment shown in FIGS. 2A-2C, the embodiment illustrated in FIGS. 3A-3C has a second duct 320 that is shorter than the first duct 310.

As illustrated in FIG. 3C, the second duct 320 is oriented axially-upward with respect to the first duct 310. For example, the second duct 320 is oriented such that the leading edge 335 of the second duct 320 is oriented axially-upward from the leading edge 313 of the first duct 310. In other words, the leading edge 345 of the second duct 320 is located forward and upward from the leading edge 313 of the first duct 310. Additionally, the trailing edge 340 of the second duct 320 and the trailing edge 317 of the first duct 310 are axially aligned so that there is an axial distance 360 between the leading edge 345 of the second duct and the leading edge 313 of the first duct 310. The first duct 310 and the second duct 320 can define a channel 330 therebetween. As illustrated in FIG. 3C, the channel 330 can be a converging-diverging channel. For example, the width 375 of the channel 330 can vary from between the trailing edges 317, 340 of the first and second ducts 310, 320 to the leading edges 313, 345 of the first and second duct 310, 320 (e.g., the width 375 can increase or decrease). As the first duct 310 and the second duct 320 are axisymmetric, the converging-diverging channel width 330 does not vary circumferentially around the rotor 300. Also as shown in FIG. 3C, the first duct 310 and the second duct 320 have a cross-sectional air foil shape. However, in alternative embodiments, the first duct 310 and the second duct 320 can have a cross-section that is a cylindrical shape, an oval shape, a wing or any other shape that permits axial air flow into the inlet 325. In such embodiments, air flow enters into the second channel 330 near the trailing edge 340 of the second duct. This air flow entering near the trailing edge 340 is in opposite direction to that of the first duct 310 especially near the leading side of the vehicle in horizontal flight.

Similar to the double-ducted fan illustrated in FIGS. 2A-2C, in FIGS. 3A-3C, during horizontal flight, cross-wise air flow will encounter the second duct 320 before it encounters the leading edge 313 of the first duct 310 (e.g., air flow will move from the left to the right in FIG. 3C). As the cross-wise air flow encounters the duct lip 347, a portion of the air flow will travel upwards towards the leading edge 345 of the second duct 320, and a portion of the air flow will travel downwards towards the trailing edge 340 of the second duct 320, as the second duct 320 acts as an obstacle to the air flow. The air flow that travels across the leading edge 345 will flow across the leading edge 313 of the first duct 310, over the inlet lip 319, and into the inlet 325. The air flow that travels towards the trailing edge 340 of the second duct 320 will travel upwards through the channel 330, over the leading edge 313 of the first duct 310 and the inlet lip 319, and into the inlet 325, due to the pressure difference resulting from the orientation and shape of the second duct 320 with respect to the first duct 310 and the rotor 300.

Compared to the embodiment illustrated in FIG. 2C, in FIG. 3C, the air flow at the trailing edge 340 of the shorter second duct 320 is further directed upward into the channel 330 by the trailing edge 317 of the first duct 310. As the air flow encounters the second duct 320 first during horizontal flight, the air flow is separated at the second duct 320 before it encounters the inlet lip 319 of the first duct 310, thereby enabling a uniform air flow to encounter the first duct 310. The upward air flow in the channel 330 adjusts the static pressure distribution near the leading edge 313 of the first duct 310 and inlet lip 319 of the first duct 310. This static pressure adjustment can generate a flow or circulation control effect near the inlet lip 319 of the first duct 310. The circulation control effect near inlet lip 319 of the first duct 310 can eliminate inlet lip separation of the flow directed into the inlet 325. Thus, the air flow entering the inlet 325 is substantially uniform, and the inlet separation that would typically occur in conventional ducted fans is reduced. As a more uniform air flow profile enters the inlet 325, more uniform air flow exits the rotor 305, thereby reducing energy loss, total pressure imbalance, and mass-flow rate imbalance that can be associated with air flow distortion. Additionally, the double-ducted fan 3000 having a second duct 320 shorter than the first duct 310, the thrust generated by the double-ducted fan can be increased and enhanced as compared to conventional single-ducted fans. Furthermore, with the embodiment illustrated in FIGS. 3A-3C, the VSTOL can operate in a horizontal flight without enhancing the nose-up pitching moment of the vehicle. For example, the illustrated embodiment enhances thrust and reduces nose-up pitching moment in forward flight without substantial drag loss as compared to conventional ducted fans. There is also an additional benefit of reducing flow induced vibrations originating near the inlet lip section 319 of the first duct 310 because the double-ducted fan can eliminate inlet lip separation driven recirculatory flow at downstream of inlet lip 319 of the first duct 310.

In at least one embodiment, for example FIGS. 3A-3C, the size of the leading edge 313 of the first duct 310 can be used as the basis of the orientation of the second duct 320 with respect to the first duct 310. For example, the diameter of the leading edge 313 of the first duct 310 can be the parameter that is used as the basis for determining the orientation of the second duct 320 with respect to the first duct 310. For example in FIGS. 3A-3C, the second duct 320 is an airfoil that is substantially cambered. The second duct 320 can also have a leading edge that is set to two-thirds the diameter of the leading edge 313 of the first duct 310. The angular orientation and the axial position of the second duct 320 can provide the control and enhancement of flow near the leading side of the rotor 305. The leading edge 345 of the second duct 320 can be shifted upwardly in the vertical direction with respect to the leading edge 313 of the first duct 310. The vertical distance 360 between the leading edge 345 of the second duct 320 and the leading edge 313 of the first duct 310 can be one-third the diameter of the leading edge 313 of the first duct 310. The horizontal distance between the leading edge 313 of the first duct 310 and the leading edge 345 of the second duct 320 can be four times the diameter of the leading edge 313 of the first duct 310. The length 350 of the second duct 320 can be five times the diameter of the leading edge 313 of first duct 310. Also, the separation distance or the width 375 of the channel 330 between the first duct 310 and the second duct 320 can be 0.8 times the diameter of the leading edge 313 of the first duct 310. The various combinations of the relative separation distances between the first duct 310 and 320 and the lengths of the cross-sectional airfoils of the first duct 310 and the second duct 320 can be used to optimize the lip separation control effectiveness for various edgewise flight velocities of the double-ducted fan based vehicles. Those of ordinary skill in the art will appreciate that the relative measurements described above can be applied to any of the embodiments described herein. Further, it will be appreciated that other ratios of dimensions of the first duct 310 and the second duct 320 can be implemented to determine the size and orientation of the ducts 310, 320 of the double-ducted fan of the present technology.

Also illustrated in FIGS. 3A-3C, the first duct 310 and the second duct 320 define a channel 330 therebetween. The channel 330 begins at the leading edge 313 of the first duct 310 and terminates at the trailing edge 340 of the second duct 320 and has a length measured from the leading edge 313 to the trailing edge 340. In FIGS. 3A-3C, the channel 330 can have a length that is approximately five times the diameter of the leading edge 313 of the first duct 310. The width 375 of the channel 330 at the entrance can be approximately equal to the diameter of the leading edge 313 of the first duct 310. The entrance of the channel 330 can be at the trailing edge 340 of the second duct 320. Due to the geometry and orientation of the first and second ducts 310, 320, there is a vertically upward net flow through the channel 330 beginning proximate to the trailing edge 340 of the second duct 320 and upward towards the leading edge 313 of the first duct 310. The dynamic pressure at the entrance of the channel 330 can provide the vertically upward net flow. The diverging width 375 of the channel 330 can provide a deceleration of the flow therethrough. The deceleration of the flow can adjust the static pressure gradient therein prior to the air flow's interaction with the leading edge 313 of the first duct 310. The self-adjusting dynamic pressure of the air flow entering the channel 330 can be proportional with the square of the forward flight velocity of the vehicle.

The flow of air into the inlet 325 of the rotor 305 is vertically down. For example, air flows from the leading edge 313 of the first duct 310 to the trailing edge 317 of the first duct 310 towards the outlet 326. The vertically down flow direction can be provided by the relatively low stagnation pressure at the inlet 325. Also, the vertically down flow can be induced by the static pressure field of the flow at the outlet 326, thereby generating a thrust force for the vehicle. Therefore, with such a geometry and orientation of the first and second ducts 310, 320, the lip 347 of the second duct 320 in cooperation with the first duct 310 can reduce the lip separation typically observed in conventional single ducted fans. As the lip separation is reduced, a substantially uniform flow at the outlet 326 can be observed, thereby providing enhanced control, and efficiency of horizontal flight of the VSTOL. Reduced lip separation can also reduce vibrations of the flight vehicle.

Figure 4A:
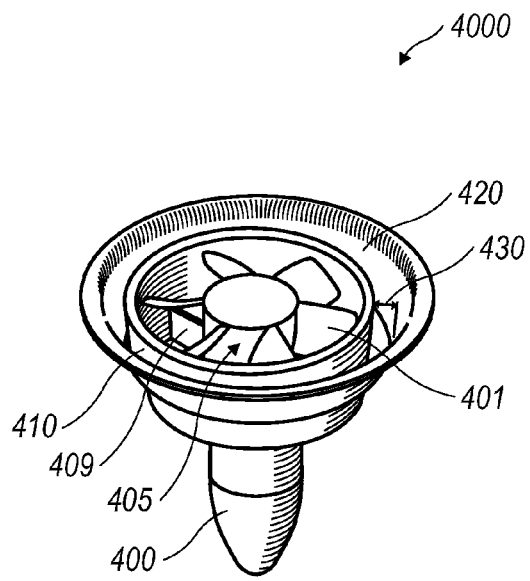
FIG. 4A is a perspective view of another embodiment of a double-ducted fan in accordance with the technology that is the subject matter of this disclosure, which has eccentrically oriented ducts.
Figure 4B:
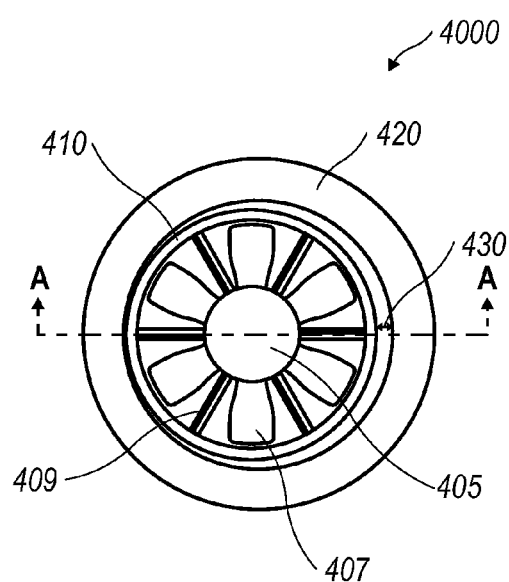
FIG. 4B is a front view of the double-ducted fan illustrated in FIG. 4A.
Figure 4C:
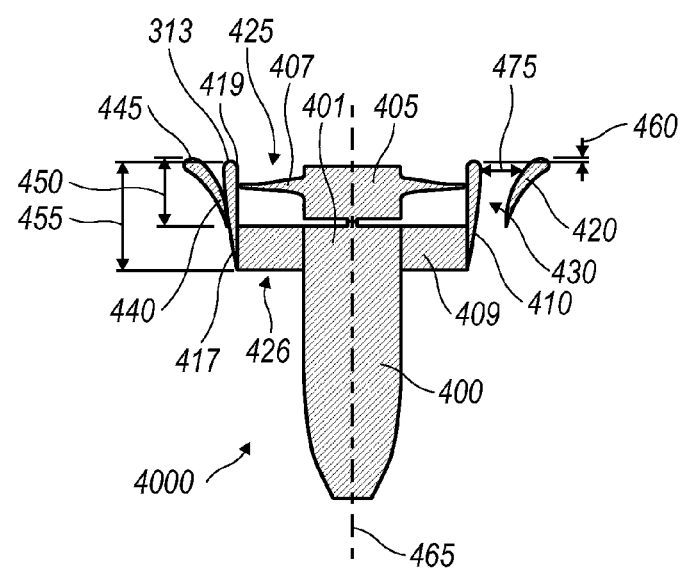
FIG. 4C is a vertical cross-section view, taken along lines A-A, of the double-ducted fan illustrated in FIG. 4A.

FIGS. 4A-4C illustrate another embodiment of the double-ducted fan described herein. FIGS. 4A-4C are substantially similar to the double-ducted fans illustrated in FIGS. 2A-3C, but differ in that the second duct 420 is eccentrically oriented with respect to the first duct 410. Common elements between the double-ducted fans illustrated in FIGS. 2A-3C are shown in FIGS. 4A-4C except that the reference numerals are in the 400 series. As shown in FIGS. 4A-34C, another embodiment of the double-ducted fan 4000 includes a hub 400, a rotor 405, first duct 410 circumscribing the rotor 400, and second duct 420.

The second duct 420 is radially spaced from the first duct. The second duct 420 is coupled to the first duct 410 such that the rotor 405 is at the center of the double-ducted fan 4000. The second duct 420 has a leading edge 445, a trailing edge 440, and a second length 450 between the leading edge 445 and the trailing edge 440. For example, as illustrated in FIG. 4C, the second duct 420 has a second length 450 that is shorter in length than the first length 455 of the first duct 410. However, in at least one alternative embodiment, the second duct 420 can have a second length 450 longer than the first length 455 of the first duct 410. In the illustrated embodiment, the first duct 410 and the second duct 420 are cylindrical structures; however, one of ordinary skill in the art will appreciate the first duct 410 and the second duct 420 can be any structure that will direct cross-wise air flow into the inlet 425 of the rotor 405.

As compared to the double-ducted fan illustrated in FIGS. 2A-3C, the double-ducted fan illustrated in FIGS. 4A-4C has the first duct 410 and the second duct 420 eccentrically oriented. As illustrated in FIG. 4C, the second duct 420 is oriented axially-upward with respect to the first duct 410. For example, the second duct 420 is oriented such that the leading edge 445 of the second duct 420 is oriented axially-upward from the leading edge 413 of the first duct 410. The trailing edge 440 of the second duct 420 and the trailing edge 417 of the first duct 410 are aligned such that there is an axial distance 460 between the leading edge 445 of the second duct and the leading edge 413 of the first duct 410. The first duct 410 and the second duct 420 define a channel 430 therebetween. As illustrated in FIG. 4C, the channel 430 is a converging-diverging channel. For example, the width 475 of the channel 430 can vary from the trailing edges 417, 440 of the first and second ducts 410, 420 to the leading edges 413, 435 of the first and second duct 410, 420 (e.g., the width 475 can increase or decrease). As the first duct 410 and the second duct 420 are eccentric, the width 475 and shape of the channel 430 can vary circumferentially around the rotor 400. For example, the width 475 of the portion of the channel 430 where the first duct 410 is closest to the inner wall of the second duct 420 (the width 475 to the left of the central axis 465 in FIG. 4C) is smaller than the width of the portion of the channel 430 where the first duct 410 is furthest from the inner wall of the second duct 420 (the width 475 to the right of the central axis 465 in FIG. 4C). In FIGS. 4A-4C, the second duct 420 can be movable with respect to the first duct 410 and the hub 400. For example, the second duct 420 can be axially movable with respect to the first duct 410 and the hub 400, thereby varying the width 475 of the channel 430. Also as shown in FIG. 4C, the first duct 410 and the second duct 420 have an airfoil shape. However, in alternative embodiments, the first duct 410 and the second duct 420 can have a cylindrical shape, an oval shape, or any other shape that permits axial air flow into the inlet 445 of the rotor 405.

Similar to the double-ducted fan illustrated in FIGS. 2A-3C, in FIGS. 4A-4C, during horizontal flight, cross-wise air flow will encounter the second duct 420 before it encounters the leading edge 413 of the first duct 410 (e.g., air flow will move from the left to right in FIG. 4C). However, unlike the double-ducted fan illustrated in FIGS. 2A-3C, the double-ducted fan illustrated in FIGS. 4A-4C provides a channel 430 that can vary in shape and width depending on the angle of attack which the double-ducted fan 4000 is oriented. As the cross-wise air flow encounters the duct lip 447, a portion of the air flow will travel upwards towards the leading edge 445 of the second duct 420, and a portion of the air flow will travel downwards towards the trailing edge 440 of the second duct 420. The air flow that travels across the leading edge 445 will flow across the leading edge 413 of the first duct 410, over the inlet lip 419, and into the inlet 425. The air flow that travels towards the trailing edge 440 of the second duct 420 will travel upwards through the channel 430, over the leading edge 413 of the first duct 410 and the inlet lip 419, and into the inlet 425. Compared to the double-ducted fan illustrated in FIGS. 2C and 3C, the eccentric orientation of the first duct 410 and second duct 420 enables the channel 430 to be opened or closed, thereby enabling air flow at the trailing edge 440 of the second duct 420 to be directed upward into the channel 430 and over and into the inlet 425. Adjusting the width 475 of the channel 430 allows for more controlled air flow into the inlet 425. As the air flow encounters the second duct 420 first during horizontal flight, the air flow is separated at the second duct 420 before it encounters the inlet lip 419 of the first duct 410. Thus, the air flow entering the inlet 425 is substantially uniform, and the lip separation that would typically occur in conventional ducted fans is reduced. As a substantially uniform air flow profile enters the inlet 425, substantially uniform air flow exits the outlet 426, thereby reducing energy loss, total pressure imbalance, and mass-flow rate imbalance that can be associated with air flow distortion. Additionally, as the illustrated embodiment in FIGS. 4A-4C provide for a variable width 475, the double-ducted fan 4000 allows for a greater range of operation as compared to conventional ducted fans. Also, the illustrated embodiment enhances lip flow control over a wide range of flight velocities as compared to conventional ducted fans.

Figure 5:
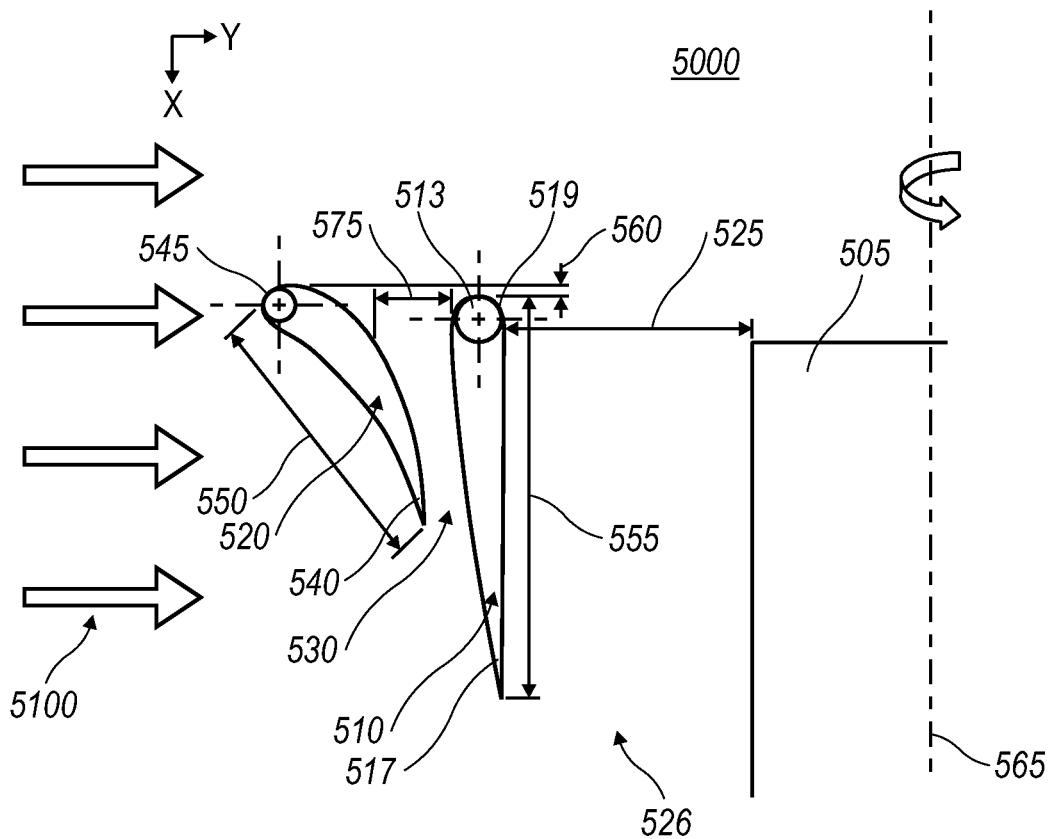
FIG. 5 is a schematic partial cross-section view of the exemplary double-ducted fan illustrated in FIG. 2A illustrating the flow of air across the double-ducted fan.

The movement of air flow through the double-ducted fan as illustrated in any of the embodiments illustrated in FIGS. 2A-4C and 6A-7D will now be described. For purposes of brevity, the movement of air through the double-ducted fan will be described with respect to the illustrated embodiment in FIG. 5. FIG. 5 illustrates a double-ducted fan 5000 having a second duct 520 shorter than the first duct 510. FIG. 5 is a partial vertical cross-section view of an exemplary double-ducted fan 5000 in accordance with an exemplary embodiment. In particular, FIG. 5 is a vertical cross-section view the left side of the double-ducted fan 5000 with respect to the central axis 565. As illustrated in FIG. 5, the double-ducted fan 5000 includes a hub 500, a rotor (not shown) having a plurality of blades (not shown) rotatably coupled to the hub 500. A first duct 510 can be axially spaced from the hub 5000 and can circumscribe the rotor. A second duct 520 can be axially spaced from the first duct 510. An inlet 525 or throat is defined between the first duct 510 and the rotor. The inlet 525 can enable air flow to pass from the atmosphere to and through the blades of the rotor. An outlet 526 is defined between the first duct 510 and the hub 500. In FIG. 5, the second duct 520 can have a length 550 shorter than the length 555 of the first duct 510. Additionally, the second duct 520 is oriented axially upward from the leading edge 513 of the first duct 510 such that the leading edge 535 of the second duct 520 is spaced an axial distance 560 from the leading edge 513 of the first duct 510. The second duct 520 has the cross-section of an air foil and is oriented at an angle with respect to the first duct 510. In FIG. 5, the second duct 520 is cambered away from the first duct 510 and with respect to the central axis 565 of the double-ducted fan 5000.

A channel 530 is defined between the second duct 520 and the first duct 510. In FIG. 5, the channel 530 is a converging-diverging channel whereby the width 575 of the channel 530 decreases from between the leading edges 513, 535 of the first duct 510 and the second duct 520 to between the trailing edges 517, 540 of the first duct 510 and the second duct 520. During operation in forward flight in which the double-ducted fan 5000 is oriented at a ninety (90) degree angle of attack with respect to the ground, horizontal or cross-wise air flow (depicted as 5100) encounters the second duct 520. In the illustrated embodiment, air flow moves from the leading side of the double-ducted fan 5000, which is to the left of the central axis 565, to the trailing side (not shown) of the double-ducted fan, which is to the right of the central axis 565. The flow in the channel 530 is directed from the trailing edge 517 to the leading edge 513 of the first duct 510. When moving away from the leading side of the second duct 520, air flow in the channel 530 is directed from the inlet 525 to the outlet 526. As a result of the orientation and shapes of the first duct 510 and the second duct 520, the horizontal air flow is directed upward through the channel 530, over the first duct 510, and downward into the inlet 525 of the rotor. The upward flow direction through the channel 530 and the downward flow into and through the inlet 525 provides for controlled inlet flow distortion and a reduced air flow separation near the inlet lip 519 of the leading side (the left side of the illustrated embodiment) of the double-ducted fan 5000. For example, since the cross-wise air flow encounters the leading edge 545 of the second duct 520, substantially uniform air flow travels across the leading edges 545, 513 of the second duct 520 and the first duct 510. The inlet separation at the inlet lip 519 is thereby reduced allowing for less distorted air flow that enters the inlet 525.

Additionally, the orientation and shapes of the first duct 510 and second duct 520 enhance the uniformity of air flow at the outlet 526 and reduce power differentials between the leading side and trailing side of the double-ducted fan 5000. For example, because the portion of air flow that is directed upwards through the channel 530 meets the portion of air flow that travels across the leading edge 545 of the second duct 520, the air flow is substantially uniform as it travels across the leading edge 513 of the first duct 510. As a result, air flow from the rotor 500 at the outlet 526 can provide a thrust force to enhance the performance of the vehicle to which the double-ducted fan 5000 is coupled. Furthermore, the resulting shape of the double-ducted fan 5000 due to the orientation and shape of the first duct 510 and second duct 520 can reduce drag during forward flight.

FIGS. 6A-6C illustrate another embodiment of the double-ducted fan described herein. FIGS. 6A-6C are substantially similar to the double-ducted fans illustrated in FIGS. 2A-4C, but differ in that the second duct 620 is a partial duct. Common elements between the double-ducted fans illustrated in FIGS. 2A-4C are shown in FIGS. 6A-6C except that the reference numerals are in the 600 series. As shown in FIGS. 6A-6C, the double-ducted fan 6000 includes a hub 600 having a front portion 620 and an end portion 615. A rotor 605 having a plurality of blades 607 is rotatably coupled to the front portion 601 of the hub 600. A first duct 610 is coupled to the rotor 605 such that the first duct 610 surrounds the rotor 605 and is radially spaced from the hub 600. The first duct 610 has a leading edge 613, a trailing edge 617, and a first length 655 between the leading edge 613 and the trailing edge 617. As shown in FIGS. 6A-6C, the first duct 610 is coupled to the hub 600 at the trailing edge 617 of the first duct 610 by a plurality of outlet vanes 609. An inlet 625 is defined between the leading edge 613 of the first duct 610 and the rotor 605. An outlet 626 is defined between the trailing edge 217 of the first duct 610 and the hub 600. Air flow can pass through the inlet 625 to the outlet 626 when the double-ducted fan 6000 is in operation during horizontal motion and while oriented at a ninety (90) degree angle of attack with respect to the ground. The inlet 625 includes an inlet lip 619 proximate to the leading edge 613 of the first duct 610.

The second duct 620 can be radially spaced from the first duct 610. The second duct 620 is a partial duct. For example, the second duct 620 can circumscribe less than the entire circumference of the first duct 610, as illustrated in FIGS. 6A-6C. In some embodiments, the second duct 620 can be shaped as a partial circumferential segment of a duct that is radially spaced from the first duct 610, as illustrated in FIG. 6A. The second duct 620 is coupled to the first duct 610 such that the rotor 605 is at the center of the double-ducted fan 6000. The second duct 620 has a leading edge 645, a trailing edge 640, and a second length 650 between the leading edge 645 and the trailing edge 640. For example, as illustrated in FIG. 6C, the second duct 620 has a second length 650 is shorter in than the first length 655 of the first duct 610. However, in at least one embodiment, the second duct 620 can have a second length 650 longer than the first length 655 of the first duct 610. In FIGS. 6A-6C, the first duct 610 and the second duct 620 are cylindrical structures; however, one of ordinary skill in the art will appreciate the first duct 610 and the second duct 620 can be any structure that will direct cross-wise air flow into the inlet 625 of the rotor 605. Additionally, as illustrated in FIGS. 6A-6C, the second duct 620 is positioned proximate to the leading side of the first duct 610. In FIGS. 6A-6C, the trailing ledge 640 of the second duct 620 and the trailing edge 617 of the first duct 610 are aligned such that there is an axial distance 660 between the leading edge 645 of the second duct and the leading edge 613 of the first duct 610. As the air flow encounters the second duct 620 first during horizontal flight, the air flow is separated at the second duct 620 before it encounters the inlet lip 619 of the first duct 610. Thus, the air flow entering the inlet 625 is substantially uniform, and the lip separation that would typically occur in conventional ducted fans is reduced. As a substantially uniform air flow profile enters the inlet 625, substantial uniform air flow exits the outlet 626, thereby reducing energy loss, total pressure imbalance, and mass-flow rate imbalance that can be associated with air flow distortion.

Similar to the double-ducted fan illustrated in FIGS. 2A-4C, in FIGS. 6A-6C, during horizontal flight, cross-wise air flow will encounter the second duct 420 before it encounters the leading edge 613 of the first duct 610 (e.g., air flow will move from the right to the left in FIG. 6C). However, unlike the double-ducted fan illustrated in FIGS. 2A-4C, the double-ducted fan 6000 illustrated in FIGS. 6A-6C, the second duct 620 is a circumferential segment of a duct. As the overall weight VSTOL vehicles is an important factor in VSTOL vehicle design, the weight of the fans that provide the lift and propulsion of the VSTOL vehicle is also important. The double-ducted fan 6000 illustrated in FIG. 6A having a partial second duct 620 reduces the weight added by the double-ducted fan 6000 to the VSTOL. For example, as the second duct 620 is a partial duct, the second duct 620 comprises less material and weight, thereby adding minimal weight to the double-ducted fan 6000. As a result, the double ducted fan 6000 adds less weight to a VSTOL than the double-ducted fans illustrated in FIGS. 2A-4C while still enhancing control of the inlet lip separation during horizontal flight. The partial second duct 620 can be manufactured in a deployable style so that the distance between the first duct 610 and the partial second duct 620 can be controlled as a function of horizontal flight speed. The partial second duct 620 can be fully retracted in the first few seconds of the flight of the vehicle during low horizontal vehicle speed, for example zero speed. The second duct 620 can then be deployed to define the channel 630 between the first duct 610 and the partial second duct 620. The partial second duct 620 can also be manufactured as a light weight sheet metal curved thin shell, a composite, a light weight durable curved thin shell, or other lightweight structure.

FIGS. 7A-7D illustrate another embodiment of the double-ducted fan described herein. FIGS. 7A-7D are substantially similar to the double-ducted fans illustrated in FIGS. 2A-4C and 6A-6C, but differ in that the second duct 720 is integrated in the body of the first duct 710. Common elements between the double-ducted fans illustrated in FIGS. 2A-4C and 6A-6C are shown in FIGS. 7A-7D except that the reference numerals are in the 700 series. As shown in FIGS. 7A-7D, the double-ducted fan 7000 includes a hub 700 having a front portion 701 and an end portion (not shown). A rotor 705 having a plurality of blades 707 is rotatably coupled to the front portion 701 of the hub 700. A first duct 710 having a first duct body is coupled to the rotor 705 such that the first duct 710 surrounds the rotor 705 and is radially spaced from the hub 700. The first duct 710 has a leading edge 713, a trailing edge 717, and a first length 755 between the leading edge 713 and the trailing edge 717. As shown in the illustrated embodiment, the first duct 710 is coupled to the hub 700 at the trailing edge 717 of the first duct 710 by a plurality of outlet vanes 709. An inlet 625 is defined between the leading edge 713 of the first duct 710 and the rotor 705. An outlet 726 is defined between the trailing edge 717 of the first duct 710 and the hub 700. Air flow can pass through the inlet 725 to the outlet 726 when the double-ducted fan 7000 is in operation during horizontal motion and while oriented at a ninety (90) degree angle of attack with respect to the ground. The inlet 725 includes an inlet lip 719 proximate to the leading edge 713 of the first duct 710.

The second duct 720 is integrally formed in the first duct 710. For example, the body of the first duct 710 (e.g., the first duct body) can define the second duct 720, as illustrated in FIGS. 7A-7D. A mouth 721 is formed in a side 714 of the first duct 710 and a channel 730 is formed in at a top surface 711 of the first duct 710. The channel 730 defines an aperture 731 at the upper surface 711 of the first duct 710. The channel 730 and the mouth 721 are in fluid communication, thereby allowing flowing air to enter through the mouth 721 and exit at the channel 730 into the inlet 725 of the rotor 705. The mouth 721 and channel 730 define the second duct 720. The second duct 720 has a leading edge 745, a trailing edge 740, and a second length 750 between the leading edge 745 and the trailing edge 740. For example, in FIG. 7D, the second duct 720 has a second length 750 is shorter in than the first length 755 of the first duct 710. However, in at least one alternative embodiment, the second duct 720 can have a second length 750 longer than the first length 755 of the first duct 710. In FIGS. 7A-7D, the first duct 710 and the second duct 720 are cylindrical structures; however, one of ordinary skill in the art will appreciate the first duct 710 and the second duct 720 can be any structure that will direct cross-wise air flow into the inlet 725 of the rotor 705. Additionally, as illustrated in FIGS. 7A-7D, the second duct 720 is positioned proximate to the leading side of the first duct 710. The trailing edge 740 of the second duct 720 and the trailing edge 717 of the first duct 710 are aligned such that there is an axial distance 760 between the leading edge 745 of the second duct and the leading edge 713 of the first duct 710. The second duct 720 can be defined in the first duct 710 and oriented such that the air flow decelerates at the aperture defined in the top surface 711. Also in FIGS. 7A and 7B, the side 714 of the first duct 710 can be chamfered at the corners of the side 714. In at least some implementations, the double-ducted fan 7000 can be integrated into a wing of a flight vehicle or can be integrated into the body of a VSTOL.

As the air flow encounters the second duct 720 first during horizontal flight, the air flow is separated by the second duct 720 and directed towards the mouth 721 and through the channel 730 before it encounters the inlet lip 719 of the first duct 710. Thus, the air flow entering the inlet 725 is substantially uniform, and the lip separation that would typically occur in conventional ducted fans is reduced. As a substantially uniform air flow profile enters the inlet 725, substantially uniform air flow exits the outlet 726, thereby reducing energy loss, total pressure imbalance, and mass-flow rate imbalance that can be associated with air flow distortion.

Figure 7A:
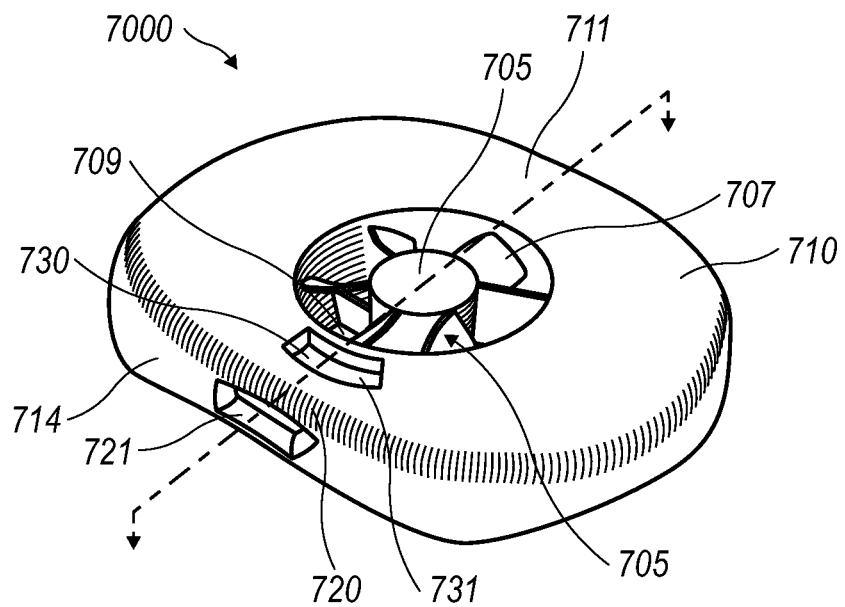
FIG. 7A is a perspective view of an exemplary double-ducted fan in a wing, which has a second duct that is defined in the body of the first duct.
Figure 7B:
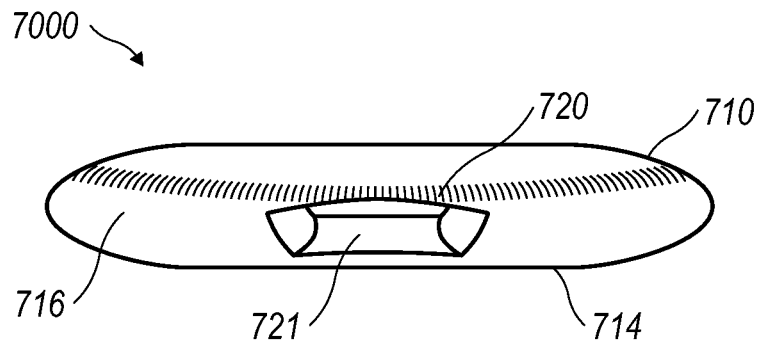
FIG. 7B is a side view of the double-ducted fan in a wing illustrated in FIG. 7A.
Figure 7C:
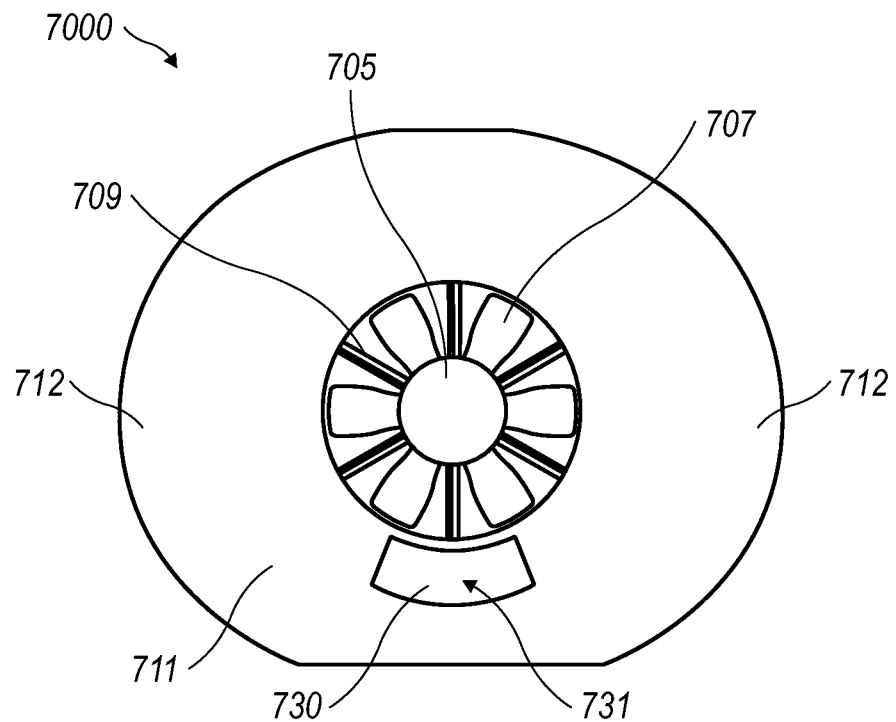
FIG. 7C is a front view of the double-ducted fan in a wing illustrated in FIG. 7A.
Figure 7D:
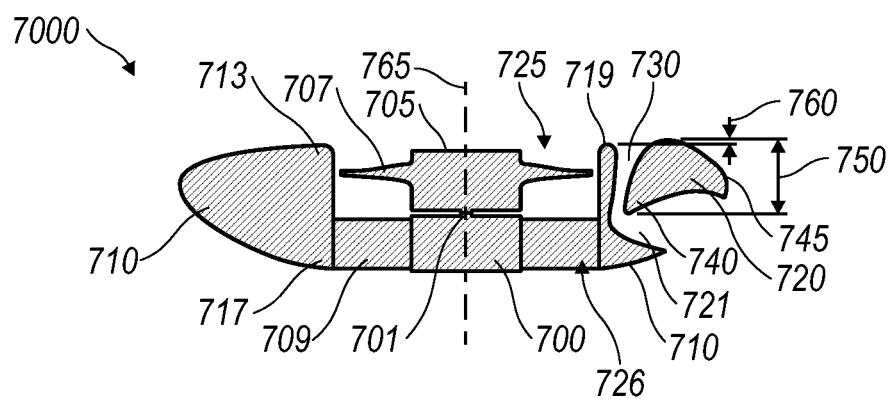
FIG. 7D is a vertical cross-section view, taken along lines A-A, of the double-ducted fan in a wing illustrated in FIG. 7A.

Similar to the double-ducted fan illustrated in FIGS. 2A-4C and 6A-6C, in FIGS. 7A-7D, during horizontal flight, cross-wise air flow will encounter the second duct 720 before it encounters the leading edge 713 of the first duct 710 (e.g., air flow will move from the right to the left in FIG. 7D). However, unlike the double-ducted fan illustrated in FIGS. 2A-4C and 6A-6C, in FIGS. 7A-7D, the second duct 720 is integrated into body of the first duct 710. By integrating the second duct 720 with the first duct 710, the flow control at the inlet lip 719 can be enhanced. As the double-ducted fan 7000 travels in edge-wise or horizontal flight, the total pressure available just in front of the mouth 712 can drive the air flow into the second duct 720 through the channel 730. The velocity of the air flow passing through the mouth 721 and the channel 730 decelerates as the air travels from the mouth 721 through channel 730 and over the inlet lip 719. Additionally, integrating the second duct 720 into the first duct 710 can allow for a smooth and aerodynamic design for VSTOL vehicles, thereby enhancing the aerodynamic properties of the VSTOL vehicle. Also, the integrated second duct 720 with the first 710 can allow for the application of the double-ducted fan and the technical advantages thereof into a VSTOL vehicle having a lifting body-type cross-section, a VSTOL vehicle having lifting fans integrated into the vehicle fuselage, or other similar vehicle. The inlet mouth 721 can be designed with variable turning vanes that may also continuously adjust the control of the lip separation at different edge-wise flight velocities in the embodiments illustrated in FIGS. 7A-7D.

It will be appreciated by those of ordinary skill in the art that any of the double-ducted fans disclosed herein can comprise lightweight sturdy materials. For example, the double-ducted fans can be manufactured from a composite skin, and inflatable duct, aluminum, thin sheet metal, or other materials that are lightweight and durable to form airfoils, wings, and the ducts of double-ducted fans described herein.

With any of the exemplary embodiments of the double-ducted fan described herein, the orientation and shape of the first duct and second duct can reduce the inlet lip separation or air flow separation at the inlet lip associated with conventional axial-flow rotor units, enhance the exit air flow of the ducted fan, enhance the thrust force of the ducted fan, and control inlet flow distortion that can be associated with conventional axial-flow rotor units.

The following figures illustrate a double-ducted fan in accordance with the present technology. While the illustrated embodiments are particularly suited for a vertical or short-take-off-and-landing vehicle (VSTOL), one of ordinary skill in the art will appreciate that the double-ducted fan described could be implemented in an uninhabited aerial vehicle; a cooling fan for a train; a passenger bus; a marine vehicle; or any other vehicle that uses an axial-flow rotor unit. Additionally, the double-ducted fan could be implemented in any axial flow fan unit where there is an inlet flow distortion due to the inlet flow direction not being well-aligned with the axis of rotation of the axial fan unit. Various modifications to and departures from the disclosed embodiments will occur to those having skill in the art. The subject matter that is intended to be within the spirit of this disclosure is set forth in the following claims.

What is claimed is:

1. A ducted air rotor comprising:
   a hub;
   a rotor coupled to the hub and having a plurality of blades;
   a first duct adapted to circumscribe the plurality of blades;
   a second duct adapted to circumscribe at least a portion of the first duct and to define a channel between the first duct and the second duct, wherein the first and second duct are eccentrically oriented, and the second duct is axially movable with respect to the first duct to adjust a portion of the width of the channel.

2. The ducted air rotor of claim 1, wherein the second duct is movable relative to the first duct to adjust at least a portion of the channel.

3. The ducted air rotor of claim 1, wherein the first duct comprises a leading edge and the rotor comprises an inlet, said channel being oriented to direct air flow cross-wise to the first duct over the leading edge into the inlet.

4. The ducted air rotor of claim 1, wherein the second duct is oriented axially upward from a leading edge of the first duct such that an axial distance is defined between a leading edge of the first duct and a leading edge of the second duct.

5. The ducted air rotor of claim 1, wherein the second duct is oriented at an angle with respect to the first duct.

6. The ducted air rotor of claim 1, wherein the second duct is cambered.

7. The ducted air rotor of claim 1, wherein the second duct has an airfoil shape.

8. The ducted air rotor of claim 1, wherein the channel is a converging-diverging channel.

9. The ducted air rotor of claim 1, wherein the first duct and the second duct are one of concentrically oriented and eccentrically oriented with respect to one another.

10. The ducted air rotor of claim 1, wherein the first duct has a first axial length and the second duct has a second axial length greater than the first axial length.

11. The ducted air rotor of claim 1, wherein the first duct has a first axial length and the second duct has a second axial length less than the first axial length.

12. A ducted air rotor comprising:
    a hub;
    a rotor coupleable to the hub and having a plurality of blades;
    a first duct body coupleable to the rotor, the first duct body defining a second duct and forming a channel therebetween; and
    wherein the first and second duct are eccentrically oriented, and the second duct is axially movable with respect to the first duct to adjust a portion of the width of the channel.

13. The ducted air rotor of claim 12, wherein:
    the first duct body comprises an upper surface and a side extending substantially perpendicular to the upper surface; and
    the channel comprises a first end at the upper surface and a second end at the side.

14. The ducted air rotor of claim 12, wherein the first duct body comprises at least one chamfered corner.

15. The ducted air rotor of claim 12, wherein the first duct body has a first axial length and the second duct has a second axial length less than the first axial length.

16. The ducted air rotor of claim 12, wherein the first duct body comprises a side defining the second duct.

17. A ducted air rotor comprising:
a hub;
a rotor coupled to the hub and having a plurality of blades;
a first duct adapted to circumscribe the rotor;
a second duct coupleable to the first duct and radially spaced from the first duct, the second duct defining a channel between the first duct and the second duct, wherein the first and second duct are eccentrically oriented, and the second duct is axially movable with respect to the first duct to adjust a portion of the width of the channel.

18. The ducted air rotor of claim 17, wherein the second duct circumscribes less than a circumference of the first duct.

* * * * *